(12) United States Patent
Janes

(10) Patent No.: US 6,957,552 B2
(45) Date of Patent: Oct. 25, 2005

(54) MANUAL GLASS LATHE

(76) Inventor: Michael Robert Janes, 7513 Timberwolf Cir., Anchorage, AK (US) 99507

( * ) Notice: Subject to any disclaimer, the term of this patent is extended or adjusted under 35 U.S.C. 154(b) by 459 days.

(21) Appl. No.: 10/179,797

(22) Filed: Jun. 24, 2002

(65) Prior Publication Data

US 2003/0233848 A1 Dec. 25, 2003

(51) Int. Cl.[7] .................................................. C03B 9/00
(52) U.S. Cl. ........................................... 65/300; 65/375
(58) Field of Search ......................... 65/271, 269, 279, 65/300, 375; 29/27 R

(56) References Cited

U.S. PATENT DOCUMENTS

| | | |
|---|---|---|
| 176,449 A | 4/1876 | Stoehr |
| 601,898 A | 4/1898 | McDonough et al. |
| 1,368,552 A | 2/1921 | Dickson |
| 1,948,560 A | 2/1934 | Borneman |
| 2,239,055 A | 4/1941 | Sawyer |
| 2,818,683 A | 1/1958 | Nieman et al. |
| 3,551,128 A | 12/1970 | Sawyer |
| 3,607,204 A | 9/1971 | Gilbertson |
| 4,082,531 A | 4/1978 | Kolleck |
| 5,803,944 A | 9/1998 | Domka |

*Primary Examiner*—Steven P. Griffin
*Assistant Examiner*—Carmen Lyles-Irving
(74) *Attorney, Agent, or Firm*—Polly L. Oliver

(57) ABSTRACT

A manual glass lathe used for shaping and coloring clear glass tubes. The manual glass lathe, in the preferred embodiment, comprises a tubular handle, designed to be held in one hand, and a thumbwheel located towards the working end of the handle, and is used by a glass-blower to precisely control the spin of a glass workpiece and the proximity of the workpiece to a flame and to various shaping tools and/or fuming rods. The handle makes use of an interior arrangement of bearings and o-rings to center and hold the mandrel, and also comprises an inner sleeve used as an inertial weight to enhance spinning momentum. Also a method for using such a manual glass lathe to shape and fume glass workpieces.

17 Claims, 3 Drawing Sheets

MANUAL GLASS LATHE

FIELD OF THE INVENTION

This invention pertains generally to glass-blowing tools and more specifically to a manual glass lathe that is used to control and rotate a glass workpiece while being blown, shaped, colored, or fumed with precious metals and/or colored rods.

BACKGROUND OF THE FIELD

The process of glass-blowing has been used for centuries to produce not only utilitarian items but also artistic ones. To create a blown glass item, a glassblower first gathers, typically from a large melting pot, a gob of molten glass on the end of a blowpipe. This gob of molten glass is to be the workpiece that will eventually become the finished item. Depending of course upon the item desired, the composition of the glass, and other factors, it is necessary that the workpiece be held in proximity to a flame, furnace, or forge in order to keep the glass in a molten state while the workpiece is being worked.

The glassblower then blows through the blowpipe to form an ever-larger "bubble" inside the molten glass while contemporaneously rotating the workpiece to ensure even heating, and also to ensure that the workpiece does not fall "out of round." With the appropriate tools and techniques, the glassblower can shape, trim, or cut the workpiece into the desired form. To achieve the desired effect, the glassblower may reheat the workpiece a number of times with a torch before transferring it to the annealing kiln.

Once the glass item has been blown and shaped into the desired form, the glassblower can add color and texture to the glass by fuming or wrapping colored rods and/or precious metals onto the item. Typically, the item is attached to a glass mandrel (a tube) so that the entire item is available to be worked by the glassblower. The mandrel must be rotated, just as the blowpipe, and in proximity to a flame while the fuming process is performed. Once the fuming has been accomplished, the finishing touches are applied.

Various attempts have been made to address the problem of holding and rotating the glass workpiece. In the U.S. Pat. No. 4,082,531 to Kolleck, there is disclosed a tubular device for holding a glass workpiece or mandrel; however, because Kolleck's holder holds the glass workpiece firmly so that the workpiece does not rotate within the holder, Kolleck's holder must in turn be held in the jaws of a lathe chuck, which will rotate the holder along with the workpiece. Although Kolleck's holder can accommodate different configurations of glass workpieces or mandrels, it is necessary that the glass mandrels themselves be specifically configured and styled to fit the holder tips. On the other hand, the present invention will accept any diameter tube when attached to a mandrel so that the invention can be used with "off-the-shelf" glass tubes as well as specifically-designed ones.

In the U.S. Pat. No. 5,803,944 to Domka, there is disclosed a motorized lathe which holds and rotates a glass mandrel. Being motorized, the lathe is dependent upon access to an appropriate power supply. Furthermore, because of the necessary gears, housings, rollers, and other elements, the Domka lathe is heavy and cumbersome and cannot offer the flexibility of a hand-held device.

SUMMARY OF THE INVENTION

The present invention solves the above-mentioned problems by providing a handheld manual glass lathe that can be used by a user to hold, control, and rotate a glass mandrel while the glassblower shapes and fumes the workpiece with precious metals and/or colored rods. The invention enables the user to spin glass workpieces of various sizes at a very wide range of rotational speeds, anywhere from extremely slow to extremely fast. Using the manual glass lathe, a glassblower can add color or texture to a clear glass workpiece in a number of different ways.

The preferred embodiment of the present invention comprises a handle with a thumb wheel assembly. The handle is tubular in shape and is hollow—defining an outer surface and an inner surface. Its outer surface is ergonomically-designed to fit a human hand (and may include a rubber gripping material), and its inner surface is designed to contain an arrangement of axial bearings, o-rings, and inner sleeve. Thus, the handle can accept the mandrel end of a glass workpiece, such mandrel sized to fit within the inner sleeve, which extends nearly the entire length of the handle. For large vessels, a larger-diameter workpiece, which is to be colored and shaped, can be attached to a thick-walled or solid mandrel. For smaller vessels, the mandrel itself can be made longer, and the user would color and shape the actual mandrel tube.

The o-rings, which in the preferred embodiment are mounted on the inner sleeve, grip the workpiece firmly and hold it within the handle while the bearings, which are seated between the inner sleeve and the handle, allow axial rotation of the inner sleeve, the mandrel, and the workpiece relative to the handle. Centering of the mandrel within the handle is automatically accomplished by the concentricity of the bearings and handle.

The thumb wheel assembly of the preferred embodiment comprises a soft rubber wheel, with central metal sleeve, on a metal axle, the axle being supported by two end caps mounted on the handle. The end caps contain captured springs which urge the thumbwheel against the inner sleeve within the handle firmly enough to provide friction to the inner sleeve. With this thumb wheel arrangement, the user can control the speed and direction of the rotation of the glass mandrel within the handle by manipulating the portion of the thumbwheel protruding outside the handle. In the preferred embodiment, the thumbwheel is located on the handle so as to be most convenient for the user gripping the handle with one hand.

The tool is used by the user placing the handle in his hand, and using his thumb to rotate the thumbwheel, which in turn rotates the inner sleeve and, through the o-rings, the glass mandrel tubing. The thumbwheel of the preferred embodiment has a 28.5 mm outer diameter, and the handle, inner sleeve, bearings, and o-rings are sized to hold a glass mandrel of 9.5 mm outer diameter. Therefore there is a 3:1 ratio, so that the glass tube (i.e., mandrel) will turn approximately three times for every full rotation of the thumbwheel. This means that the glass tube spins three times as fast as the thumbwheel, and the user can easily control the direction and speed of mandrel spin by simply moving his thumb back and forth across the wheel. The 9.5 mm mandrel tubing can be fused to any size tubing for bigger pipes, vases, ornaments, or any other kind of workpiece.

To color the workpiece (or extended mandrel tube), the user positions the rotating glass workpiece (to which color is to be added), typically held by one hand, in proximity to a flame while rotating the thumbwheel to evenly heat the glass. The user then positions a piece of gold, silver, or other metal, typically held in the other hand, in front of the flame's path that is in front of the workpiece to fume the metal onto the sticky surface of the glass workpiece. Various tools can also be used to shape the glass workpiece.

With the use of a hollow mandrel and the attachment of an airhose to the mandrel, the present invention could also be used during the blowing phase of the process.

DETAILED DESCRIPTION OF THE PREFERRED EMBODIMENT

Figure 1:
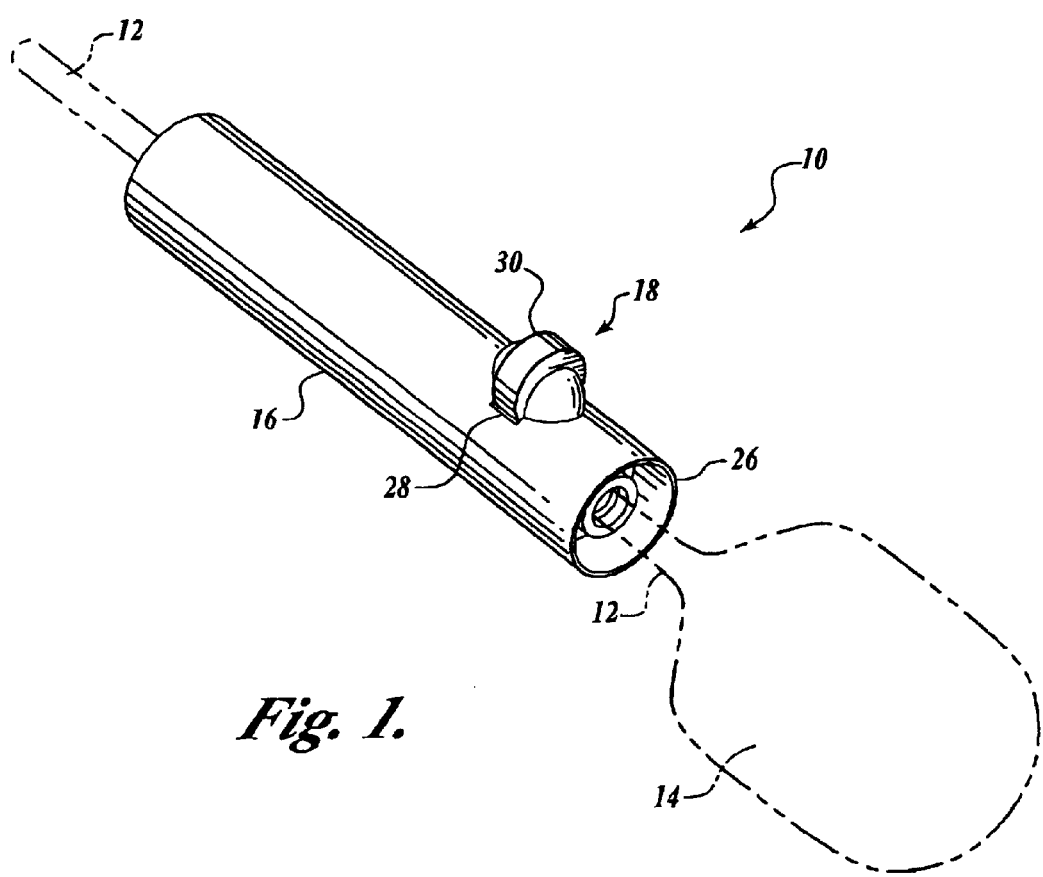
FIG. 1 is a perspective view of the preferred embodiment of the manual glass lathe as it is intended to hold a glass mandrel.

FIG. 1 shows a glass mandrel 12 attached to a glass workpiece 14 and being held by the manual glass lathe 10. As is seen, the workpiece 14 has already been blown and shaped and is being held in the manual glass lathe 10 for fuming purposes. The mandrel 12 has been attached to the workpiece, usually with an invisible, fused weld, at the location where the blowpipe was previously attached. The handle 16 allows the mandrel 12 to pass all the way through it and can be positioned at any convenient location along the mandrel 12. The o-rings (shown in FIG. 2) will arrest any lengthwise movement of the mandrel 12 at the location chosen by the user and will grip the mandrel 12 so as to prevent lengthwise slippage of the mandrel 12 within the handle 16, but will allow easy insertion and removal of the mandrel.

The thumb wheel assembly 18 can be located at almost any position along the handle, as long as it does not interfere with the bearings (shown in FIG. 2), but in the preferred embodiment, the thumb wheel assembly 18 is located approximately 1.5 inches from the working end 26 of the handle 16, and within cutout 28. One can easily visualize how the handle 16 would fit into the palm of a human hand (either right or left) with the thumb on the thumbwheel 30.

Figure 2:
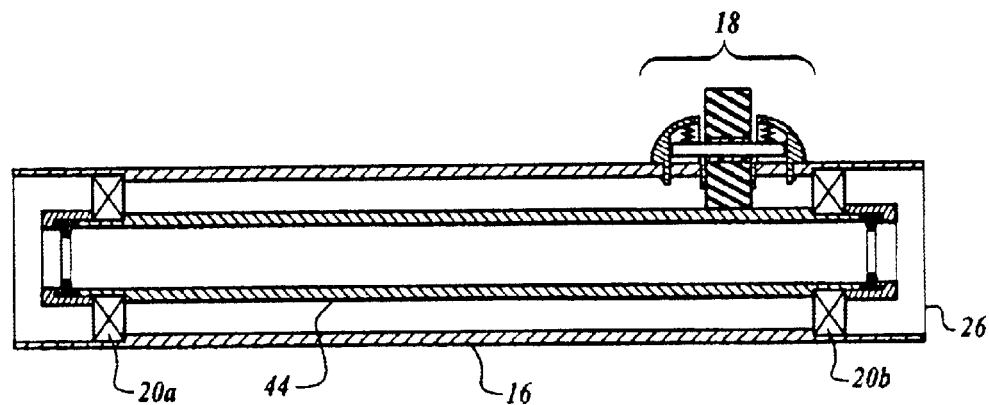
FIG. 2 is a cross-sectional view of the interior arrangement of bearings, inner sleeve, and o-rings in the preferred embodiment.

FIG. 2 shows how the two thrust bearings 20a and 20b of the preferred embodiment are concentrically arranged within the handle 16, proximate either end thereof. Certainly there can be more than two bearings; indeed, as an appropriate alternative, a third bearing could be added in the middle of the handle. However, for optimum balancing of the mandrel with a minimum of parts, two bearings have been used.

Figure 3:
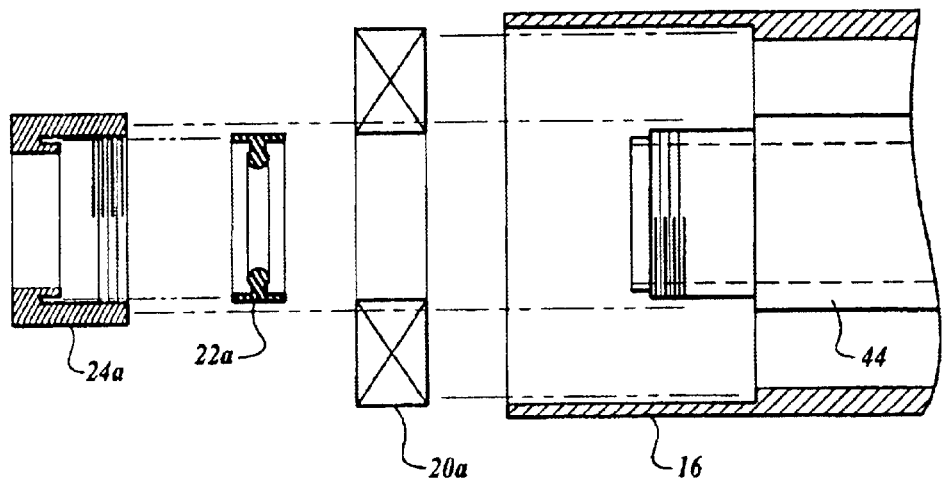
FIG. 3 is a detail view of the preferred o-ring arrangement with retaining ring.

FIG. 3 shows how the bearing 20a (each end is a mirror image of the other as to bearing and o-ring) is seated within the handle 16. The retaining ring 24a is threaded on to the inner sleeve 44 such that both the bearing 20a and the o-ring 22a are trapped in position. The inner diameter of the inner sleeve 44 and the inner diameter of the retaining ring 24a are identical and allow for the insertion of a 9.5 mm mandrel 12.

There are, of course, several different options for arranging the bearings 20 and o-rings 22a to accomplish the goal of securing the mandrel 12 within the handle 16. In one alternate embodiment, the inner race of each bearing 20 holds an o-ring 22a within a T-groove on the inner surface of the inner race, and the inner sleeve 44 is welded or otherwise fixed to the inner races. Alternately, the o-rings 22 could be fitted into conventional square grooves on the inner bearing races or mounted in some other manner. An appropriate adhesive may be used to further secure the o-rings in place.

Figure 4:
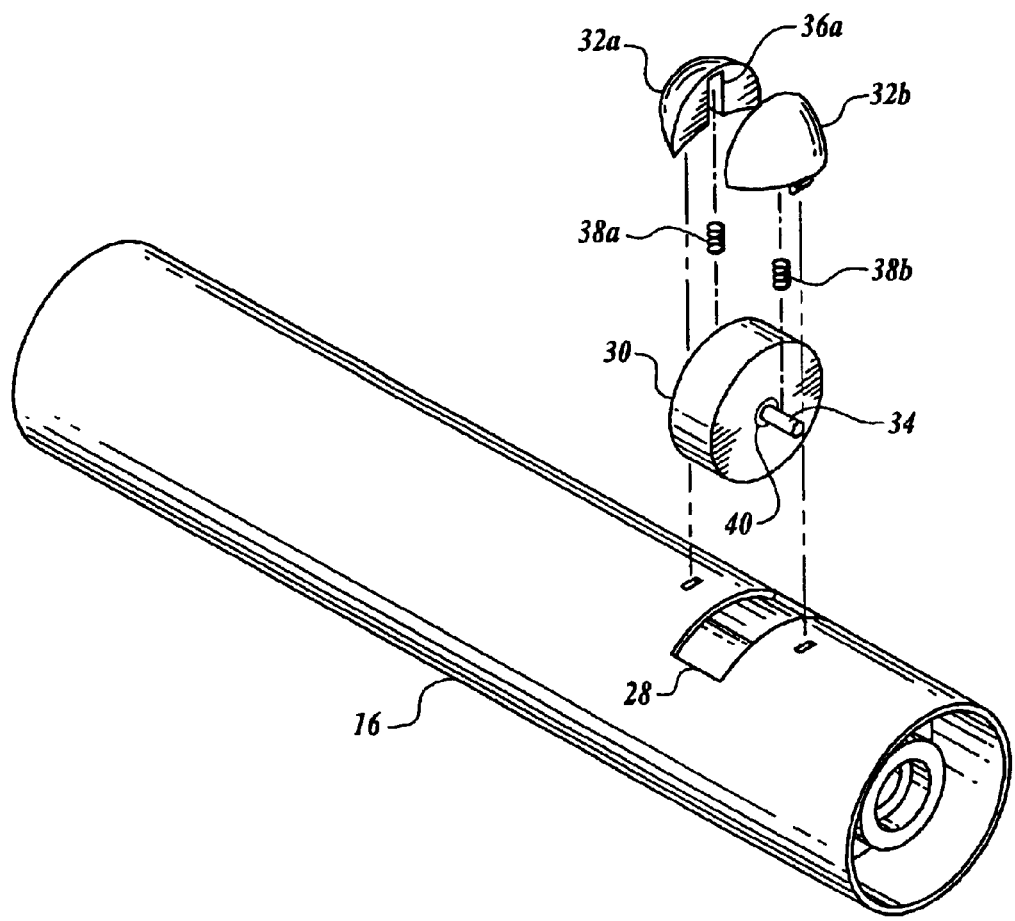
FIG. 4 is a detail view of the thumb wheel assembly of the preferred embodiment.

The thumb wheel assembly 18 is shown in exploded detail in FIG. 4. The soft rubber thumbwheel 30 is shown on its axle 34 extending through the central metal sleeve 40 and between the endcaps. There are two endcaps 32a and 32b that are fixedly mounted to the outside of the handle 16 (see also FIG. 1) on either side of the cutout 28, which allows the thumbwheel 30 as assembled to extend through the handle 16 and come into contact with the inner sleeve 44.

The thumbwheel axle 34 fits within the slots 36a, 36b (36b not shown) below captive springs 38a, 38b which urge the axle 34 inwardly towards the longitudinal axes of the handle 16 and inner sleeve 44. To assemble the thumb wheel assembly 18, the user slides the rubber wheel 30 onto the axle 34, fits the axle into the slots 36, and snaps the endcaps 32a, 32b onto the handle 16 so that the axle 34 parallels the longitudinal axis of the handle 16, and the rubber wheel 30 extends through the cutout 28 in the handle 16. The spring action ensures that the axle 34 will be urged against the inner sleeve 44 for normal operation. Once it is assembled, there is no need to disassemble the thumb wheel assembly 18 except for cleaning and maintenance.

What is claimed is:

1. A manual glass lathe for use in glass-blowing comprising:

a hollow, generally tubular housing having an outer surface which is sized to fit into the grip of a human hand and an inner surface defining a longitudinal axis, such housing having a first end and a second end;

a plurality of generally circular bearings arranged axially within the housing and sharing said longitudinal axis, such bearings having inner races and outer races, the outer races of such bearings being mounted to the inner surface of the housing;

an inner generally tubular sleeve mounted on the inner races of the bearings, such inner sleeve being generally cylindrical and having an outer surface and an inner surface and extending nearly the length of the housing and also sharing said longitudinal axis;

a plurality of generally circular o-rings arranged within and mounted adjacent the inner sleeve, such o-rings having an inner diameter sharing said longitudinal axis; and a thumb wheel assembly mounted to the outer surface of the housing comprising a thumbwheel that extends through a cutout in the housing such that the thumbwheel contacts the outer surface of the inner sleeve, such thumbwheel being capable of spinning on an axis which is generally parallel to said longitudinal axis.

2. The manual glass lathe of claim 1 wherein the outer surface of the housing is ergonomically designed to fit a human hand and includes a rubberized gripping material thereon.

3. The manual glass lathe of claim 1 wherein the housing is approximately 6 inches long and has an outer diameter of approximately 1 inch.

4. The manual glass lathe of claim 1 wherein there are two bearings, such bearings being proximate either end of the housing.

5. The manual glass lathe of claim 1 wherein there are three bearings, one bearing being generally midlength of the housing and the two other bearings being proximate either end of the housing.

6. The manual glass lathe of claim 1 wherein the bearings are chosen from the group of circular bearings including thrust bearings and axial bearings.

7. The manual glass lathe of claim 1 further comprising two retaining rings threaded onto the ends of the inner sleeve.

8. The manual glass lathe of claim 7 wherein the outer surface of the inner sleeve is stepped down proximate the ends thereof and the assembly formed by the two retaining rings being threaded onto either end of the inner sleeve forms a bearing seat at either end of the inner sleeve on the outer surface and also forms an o-ring groove proximate either end of the inner sleeve on the inner surface.

9. The manual glass lathe of claim 8 wherein the o-ring grooves are generally T-shaped.

10. The manual glass lathe of claim 1 wherein the two o-rings are mounted respectively to the inner races of the two bearings with adhesive such that the o-rings are generally concentric with the bearings and the inner sleeve is attached to and between the inner races of the bearings such that the inner sleeve has the same inner diameter as the inner races of the bearings.

11. The manual glass lathe of claim 1 in which the o-rings are seated within inward-facing grooves on the inner diameters of the inner races of the bearings such that the o-rings are generally concentric with the bearings and the inner sleeve is welded to the inner races of the bearings such that the inner sleeve has the same inner diameter as the inner races of the bearings.

12. A manual glass lathe for use in glass-blowing comprising:
  a hollow, generally tubular housing having an outer surface which is sized to fit into the grip of a human hand and an inner surface defining a longitudinal axis, such housing having a first end and a second end;
  two generally circular bearings arranged axially within the housing, one bearing proximate either end of the housing, and sharing said longitudinal axis, such bearings having inner races and outer races, the outer races of such bearings being mounted to the inner surface of the housing;
  an inner sleeve mounted on the inner races of the bearings, such inner sleeve being generally cylindrical and having an outer surface and an inner surface and extending nearly the length of the housing and also sharing said longitudinal axis, the outer surface of the inner sleeve being stepped down proximate the ends thereof;
  two retaining rings threadably mounted on the ends of the inner sleeve, such retaining rings forming a bearing seat at either end of the inner sleeve on the outer surface and also forming a T-shaped o-ring groove proximate either end of the inner sleeve on the inner surface;
  two o-rings mounted within the T-shaped grooves, such o-rings having an inner diameter sharing said longitudinal axis; and
  a thumb wheel assembly mounted to the outer surface of the housing comprising:
    two endcaps spaced apart and mounted on the housing, such that the endcaps line up generally longitudinally with respect to the housing and the inner surfaces of the endcaps face each other,
    a generally straight axle mounted between the endcaps and oriented generally longitudinally with respect to the housing, and
    a thumbwheel mounted on said axle so that the thumbwheel extends through a cutout in the housing to contact the outer surface of the inner sleeve, such thumbwheel being capable of spinning around said axle so that the axis of rotation of the thumbwheel is generally parallel to the longitudinal axis of the housing.

13. The thumb wheel assembly of claim 12 wherein
  the endcaps define two generally vertical slots, one slot in the inner surface of each of said endcaps, and two springs oriented generally vertically within the slots, one spring being trapped within each of said slots; and
  the axle is mounted between the endcaps within the slots such that the springs within the slots urge the axle toward said housing.

14. The manual glass lathe of claim 13 wherein the thumb wheel assembly is located proximate the first end of the housing such that the thumbwheel is approximately 1.5 inches from said end.

15. The manual glass lathe of claim 14 wherein the thumbwheel is made of soft rubber and is approximately 28.5 millimeters in diameter.

16. The manual glass lathe of claim 15 wherein the thumbwheel includes a central metal sleeve to ride upon the axle and reduce friction therewith.

17. The manual glass lathe of claim 16 wherein the inner diameter of the o-rings is approximately 9.5 millimeters.

* * * * *